United States Patent
Dalmia et al.

(10) Patent No.: US 11,301,296 B2
(45) Date of Patent: Apr. 12, 2022

(54) MEMORY MANAGEMENT BASED ON CLASSIFICATION OF A SOFTWARE PROCESS

(71) Applicant: Apple Inc., Cupertino, CA (US)

(72) Inventors: Kushal Dalmia, Santa Clara, CA (US); Andrey V. Talnikov, Santa Clara, CA (US); Lionel D. Desai, San Francisco, CA (US); Russell A. Blaine, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 16/808,021

(22) Filed: Mar. 3, 2020

(65) Prior Publication Data

US 2020/0379810 A1 Dec. 3, 2020

Related U.S. Application Data

(60) Provisional application No. 62/855,695, filed on May 31, 2019.

(51) Int. Cl.
*G06F 9/46* (2006.01)
*G06F 9/50* (2006.01)
*G06F 11/34* (2006.01)
*G06F 11/30* (2006.01)

(52) U.S. Cl.
CPC .......... *G06F 9/5016* (2013.01); *G06F 9/5022* (2013.01); *G06F 9/5038* (2013.01); *G06F 11/302* (2013.01); *G06F 11/3442* (2013.01); *G06F 2209/503* (2013.01)

(58) Field of Classification Search
CPC .... G06F 9/5016; G06F 9/5022; G06F 9/5038; G06F 11/302; G06F 11/3442; G06F 2209/503
See application file for complete search history.

(56) References Cited

U.S. PATENT DOCUMENTS

| | | |
|---|---|---|
| 7,827,358 B2 | 11/2010 | Watson et al. |
| 2012/0179882 A1 | 7/2012 | Bernhard, III et al. |
| 2013/0332936 A1 | 12/2013 | Magee et al. |
| 2015/0347181 A1 | 12/2015 | Myrick et al. |

*Primary Examiner* — Gregory A Kessler
(74) *Attorney, Agent, or Firm* — Womble Bond Dickinson (US) LLP

(57) ABSTRACT

Memory management in a data processing system can learn one or more behaviors of software processes such as daemon software processes and application processes, and based on information learned about the behaviors, the memory management can adjust how it controls memory usage in the system. For example, a memory management system can learn how software processes react (e.g. how quickly they relaunch) to memory recovery methods, such as system initiated terminations of one or more software processes that are performed to reclaim memory to increase available volatile memory, and based on information about how they react, the memory recovery methods can operate differently depending upon how the software reacted previously.

15 Claims, 8 Drawing Sheets

---

RECEIVE DATA INDICATING HOW A SET OF ONE OR MORE SOFTWARE PROCESSES (E.G. DAEMONS) REACT OR BEHAVE IN RESPONSE TO MEMORY MANAGEMENT ACTIONS IN A FIRST SET OF ACTIONS (E.G. MEMORY RELATED TERMINATIONS BY A SYSTEM LEVEL MEMORY MANAGER) — 251

PERFORM ONE OR MORE MEMORY MANAGEMENT ACTIONS IN A SECOND SET OF ACTIONS BASED ON THE DATA (E.G. USE DIFFERENT MEMORY MANAGEMENT PARAMETERS FOR DIFFERENT CLASSES OF PROCESSES OR USE DISTRIBUTION OF CLASSES OF PROCESSES IN PRIORITY LEVELS TO SELECT BETWEEN DIFFERENT MEMORY MANAGEMENT ACTIONS) — 253

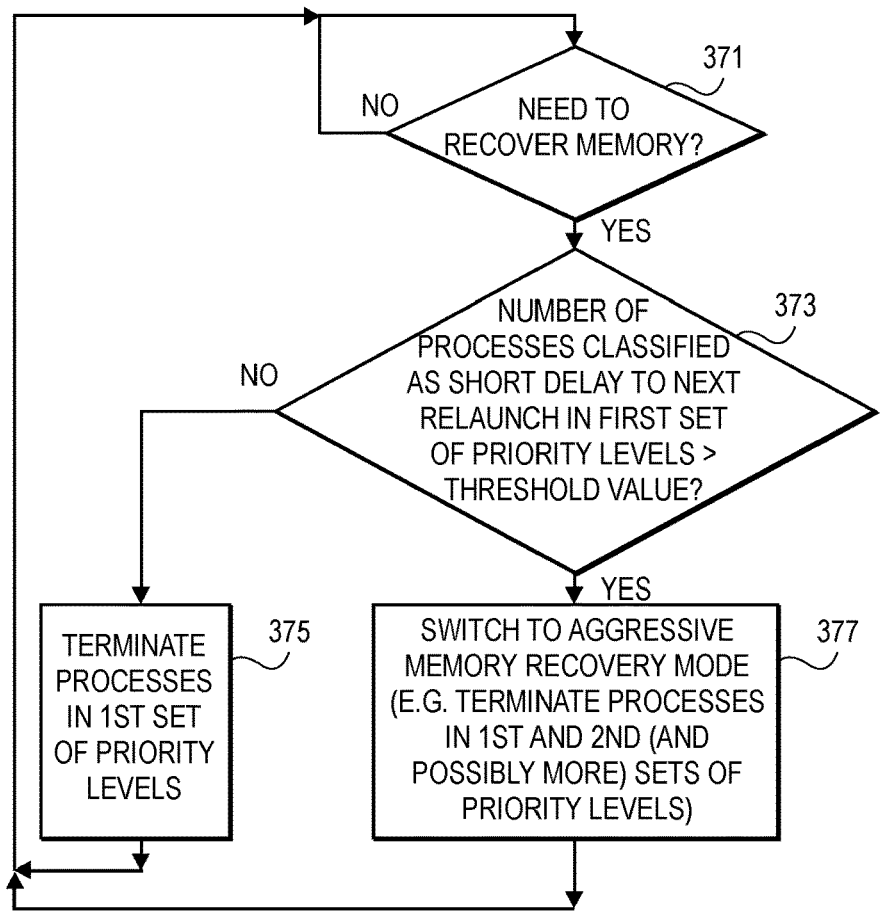
FIG. 6B
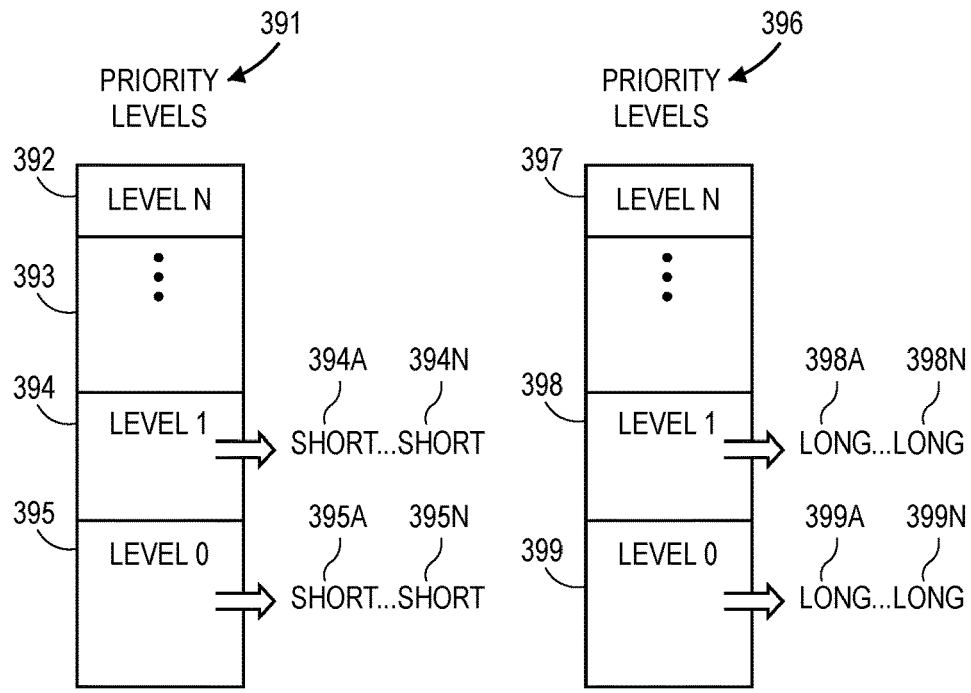
FIG. 6C  FIG. 6D

MEMORY MANAGEMENT BASED ON CLASSIFICATION OF A SOFTWARE PROCESS

This application claims the benefit of U.S. Provisional Patent Application No. 62/855,695, filed on May 31, 2019, which application is incorporated herein by reference.

BACKGROUND

This disclosure relates to memory management in data processing systems. Data processing systems, such as laptop computers, tablet computers, and smart phones often have limited memory, such as limited volatile dynamic random access memory (DRAM). Moreover, it is often the case that users will launch numerous applications and allow them to continue running after the user switches between launched applications. Further, applications and the data processing system often invoke daemon software processes that typically run (e.g., execute) or remain idle in the background. All of these processes (both applications and daemon software processes) use the limited DRAM memory, and often cause the data processing system to have insufficient DRAM memory which impacts the performance of the system.

Data processing systems can use a memory manager to attempt to reclaim DRAM memory by requesting applications and daemon processes to reduce their usage of memory. Further, these memory managers can also terminate (e.g., "kill") processes by force quitting them which will create free memory. Examples of such memory managers are described in U.S. Pat. No. 7,827,358 and US published application numbers 2012/0179882, 2013/0332936 and 2015/0347181. The memory manager can terminate idle, background processes first before terminating idle foreground processes, but it is often the case that a terminated process can be caused to be relaunched after the memory manager terminates the process. If the terminated process is quickly relaunched, there is often no appreciable and persistent gain in free memory by the process termination caused by the memory manager.

SUMMARY OF THE DESCRIPTION

In the embodiments described herein, one or more memory management techniques in a data processing system can learn one or more behaviors of software processes, such as daemon software processes and application processes, and based on the information learned about the behaviors of these software processes, the memory management system can adjust how it controls and manages memory usage in the system. For example, a memory management system can learn how software processes react in response to memory recovery methods or other memory management methods, such as system initiated terminations of one or more software processes, and based on information about how they reacted or behaved, the memory management techniques, such as memory recovery methods, can operate differently depending upon how the software reacted previously.

In one embodiment, a method can include the following operations: receiving a set of data for a set of one or more software processes, the set of data indicating how the one or more software processes behave in response to one or more memory management actions in a first set of actions that increase free available volatile memory in a data processing system; and performing one or more memory management actions in a second set of actions based upon the set of data that was derived from responses to the first set of actions. In one embodiment, the first set of actions can include process terminations performed by a memory manager and the second set of actions can be different for different classes of software processes, where the different classes are based upon the set of data. In one embodiment, the data processing system can include a first mode for memory recovery through process terminations of low priority daemon software processes in a first set of priority levels and can further include a second mode for memory recovery through process terminations of daemon software processes in the first set of priority levels and also in a second set of priority levels, wherein the data processing system switches to the second mode when the set of data indicates that insufficient memory will be recovered if the first mode for memory recovery is used. The second mode in this example is a more aggressive form of memory recovery than the first mode. In one embodiment, the second set of actions can include delaying, for a period of time, enforcement of a memory limit reduction on a software process, where the period of time is based upon data indicating how the software process behaves in response to memory related process terminations.

In one embodiment, a method can include the following operations: receiving a set of data for a software process, the set of data indicating a set of one or more time periods, each time period indicating a time between a memory related termination of the software process and a subsequent next relaunch of the software process; and classifying the software process to provide a classification for use in one or more memory management actions, wherein the classification is based on the set of one or more time periods and wherein the one or more memory management actions are based on the classification. In one embodiment, each time period in the set of one or more time periods indicates a time between consecutive events for the software process of (1) the memory related termination and (2) the subsequent relaunch such that each time period starts with a memory related termination and ends with a next relaunch that follows the immediate prior memory related termination. In one embodiment, the software process can be a daemon software process that provides services for one or more applications, and the memory related termination is a memory management action performed by a memory manager that monitors free memory and uses memory management actions to ensure the data processing system has a sufficient amount of free memory available for use by applications and daemon processes executing on the data processing system. In one embodiment, a memory related termination is a process termination caused by a memory management system that functions to ensure that the data processing system has sufficient free memory, and a memory related termination is different than a process termination that results from a crash of the process or results from a user input that causes/requests the process termination. Thus, memory related terminations do not include these other types of terminations.

In one embodiment, the classifying can be repeated over time as samples of the time periods are collected, and the samples can be rolling samples over time such that the last N time periods are used to classify the software process and the time periods before the last N time periods are ignored. In one embodiment, each time period in the set of one or more time periods is based on timestamps for the consecutive events. In one embodiment, the classification can include at least two classes: (1) a first class for a short delay to next relaunch and (2) a second class for a long delay the next relaunch. In one embodiment, the classification can be based on a most common class for delay to next relaunch over a set of sampled time periods such that a daemon that has more short delay to next relaunch than any other class over the set of sampled time periods will be classified as a short delay to next relaunch process. In one embodiment, the method can be performed separately for each daemon in a set of daemons and may also be performed for one or more software applications. In one embodiment, the classification can include three classes: (1) a short delay to next relaunch class; (2) a medium delay to next relaunch class; and (3) a long delay to next relaunch class.

In one embodiment, the learned behavior from prior memory management actions can be used in a future memory management action that delays enforcement of a memory limit reduction for a software process in response to a priority transition of the software process. For example, the enforcement of a memory limit reduction for a first class of processes can be delayed for a first time period and enforcement of a memory limit reduction for a second class of processes can be delayed for a second time period which is different than the first time period. The first class can be for processes that are classified as having a short delay to next relaunch and the first time period is longer than the second time period. The enforcement of a memory limit reduction can be in response to a change in priority of the software process from a first level to a second level which is a lower priority level than the first level. The memory reduction process can further include changing the process's priority, after the first time period, from the second level to a third level, wherein the third level has a lower priority than the second and the first levels and wherein the first level is used when the software process is active and not idle.

In one embodiment, the learned behavior from prior memory management actions can be used in a future memory management action that determines when to switch from a first mode of memory recovery to a second mode of memory recovery which is more aggressive than the first mode. In one embodiment, the first mode terminates daemon software processes in a first set of one or more priority levels, and the second mode terminates daemon software processes in the first set of one or more priority levels and also in a second set of one or more priority levels. In one embodiment, the memory recovery can be switch to the second mode based upon (1) a current free memory level and (2) how many of the daemon software processes in the first set of one or more priority levels are in a first class defined by a short delay to next relaunch or how many of the daemon software processes in the first set of one or more priority levels are in a second class defined by a long delay to next relaunch.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 6B is a flowchart which illustrates memory management actions according to one embodiment.

FIG. 6C shows an example of a process priority level data structure which can be used to indicate one type of memory management action based upon information learned about the behavior of processes in response to memory management actions.

FIG. 6D shows another example of a process priority level data structure which can be used to indicate another type of memory management action based upon information learned about the behavior of processes in response to memory management actions.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
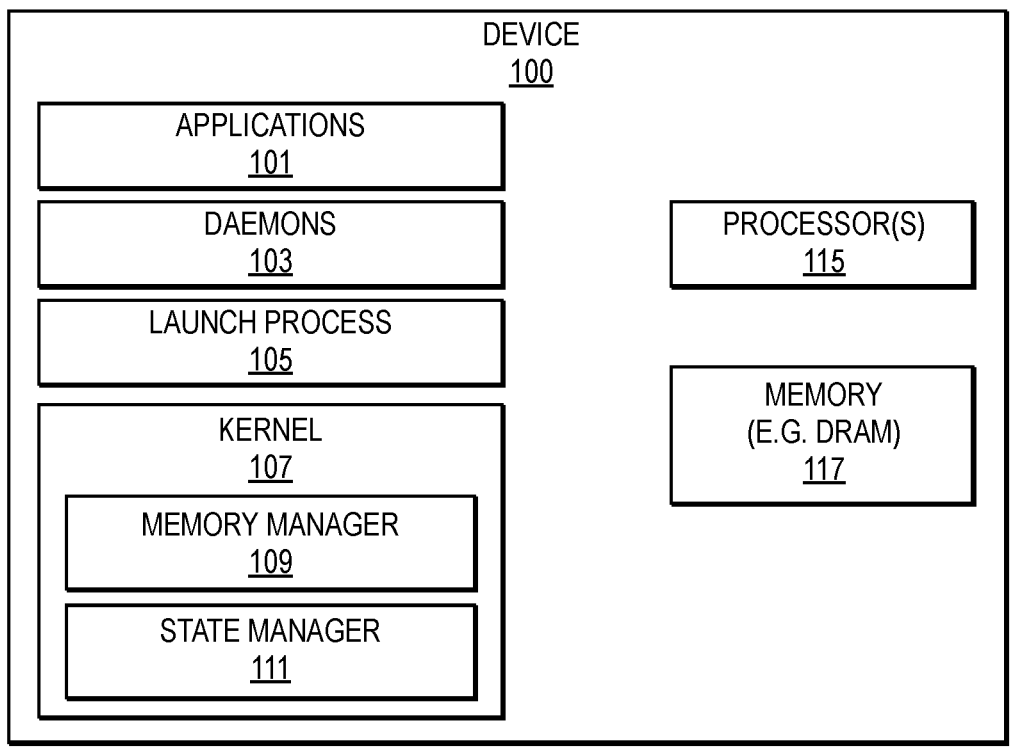
FIG. 1 is a block diagram of one embodiment of a device that can perform one or more of the memory management methods described herein.

FIG. 1 shows an example of a device that can perform memory management as described herein. The device 100 can include one or more applications, such as applications 101 which can include a variety of different user applications, such as word processing applications, web browsing applications, email applications, document viewing applications, etc. The device can also include one or more software daemons, such as daemons 103, and these daemons can be launched by the system or by the applications to provide services to the system or the applications. For example, the daemons 103 can include daemons for performing background operations such as monitoring for notifications and presenting notifications or performing other background tasks such as sending or receiving information or indexing content or other forms of daemon processes that are known in the art. The device 100 can also include a launch process 105 which is used by the operating system to launch and terminate applications and daemons, such as the one or more applications 101 and the one or more daemons 103. In one embodiment, the launch process 105 can be the "launchd" daemon application utilized in the iOS and macOS operating systems from Apple Inc. of Cupertino Calif. The kernel 107 can include a memory manager 109 and a state manager 111. The kernel 107 can be part of the operating system of the device 100 and can provide the standard services of an operating system which manage the hardware resources on behalf of the applications 101 and the daemons 103, and these hardware resources can include one or more processors, such as one or more processors 115 and one or more memories, such as memory 117. The memory 117 can be volatile DRAM memory which is managed by the memory manager 109 to ensure that there is sufficient free memory available for use by the applications 101 and the daemons 103. The state manager 111 can monitor the states of the processes, such as the applications 101 and daemons 103, using techniques known in the art and can provide information about the process states to the memory manager 109 which in turn can manage memory use for the different processes based upon priority levels of the process. As is known in the art, the memory manager 109 can use the process state of the process to assign the process to a particular process priority level for purposes of memory management. Examples of how memory managers can use priority levels and process states to manage the use of memory by the applications 101 and the daemons 103 can be found in published US application number 2015/0347181 and also in U.S. Pat. No. 7,827,358, both of which are hereby incorporated herein by reference. Jetsam, a memory management system contained in iOS operating system is an example of a memory manager.

Figure 2:
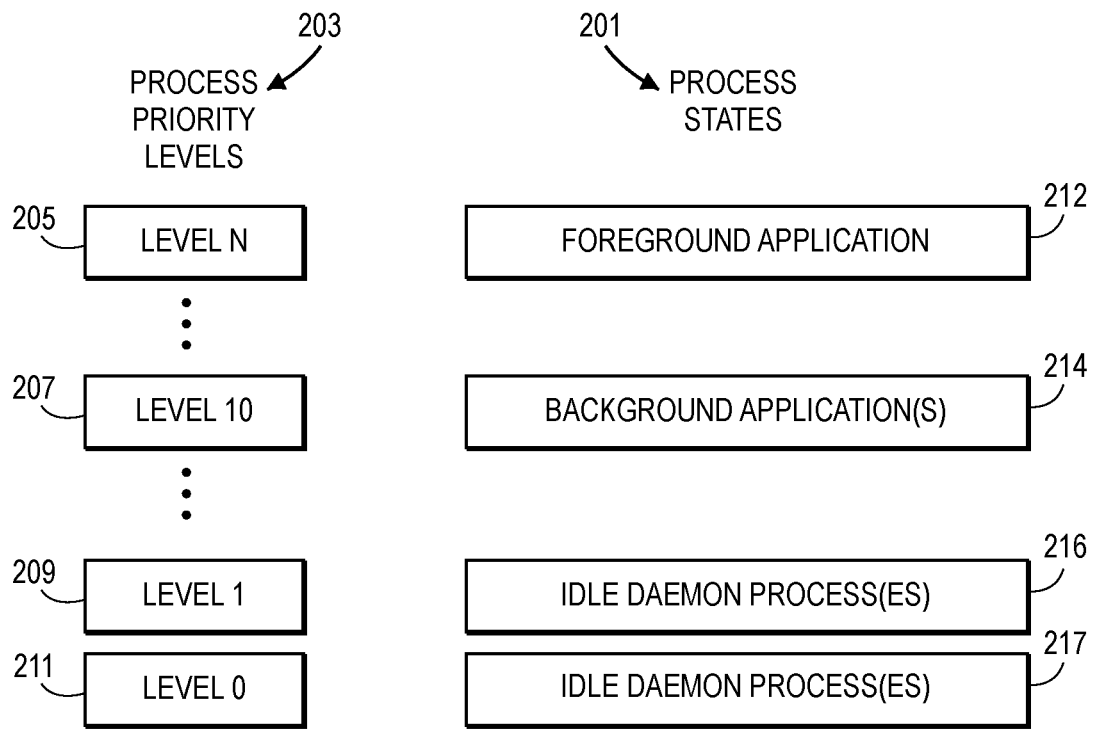
FIG. 2 shows an example of process priority levels and corresponding process states according to one embodiment.

FIG. 2 shows an example of a data structure which can be used by a memory manager, such as memory manager 109, to maintain process priority levels for a plurality of processes so that the memory manager can determine how to perform memory management actions on the different processes. In the example shown in FIG. 2, process priority levels 203 can include N+1 levels from zero to N. In the example shown in FIG. 2, the highest priority level is level 205 and the lowest priority level is level 211. Level 209 is the penultimate lowest priority level and level 207 is an intermediate priority level. As is known in the art, the memory manager can assign each process a particular level in the priority levels based upon the process state of the process, and FIG. 2 shows an example of process states 201 assigned to particular priority levels. For example, the foreground application state 212 is assigned to a foreground application which is given a high priority level such as priority level of level 205. A background application state 214 is assigned to a background application which is assigned a priority level of 207 as shown in FIG. 2, where priority level 207 is lower than priority level 205. The lowest processes in terms of priority are often daemon processes, such as idle daemon processes. In the example shown in FIG. 2, a set of one or more idle daemon processes have an idle daemon process state 216 and are assigned a priority level of level 209, and another set of idle daemon processes have an idle daemon process state 217 and are assigned a priority level of level 211 as shown in FIG. 2. As is known in the art, low priority processes are more likely (than higher priority processes) to be terminated by the memory manager in order to recover memory. Also as is known in the art, higher priority processes are less likely to be terminated by the memory manager but can still receive memory pressure notifications that request the application process to reduce memory usage. Lower priority processes also receive these memory pressure notifications.

Figure 3:
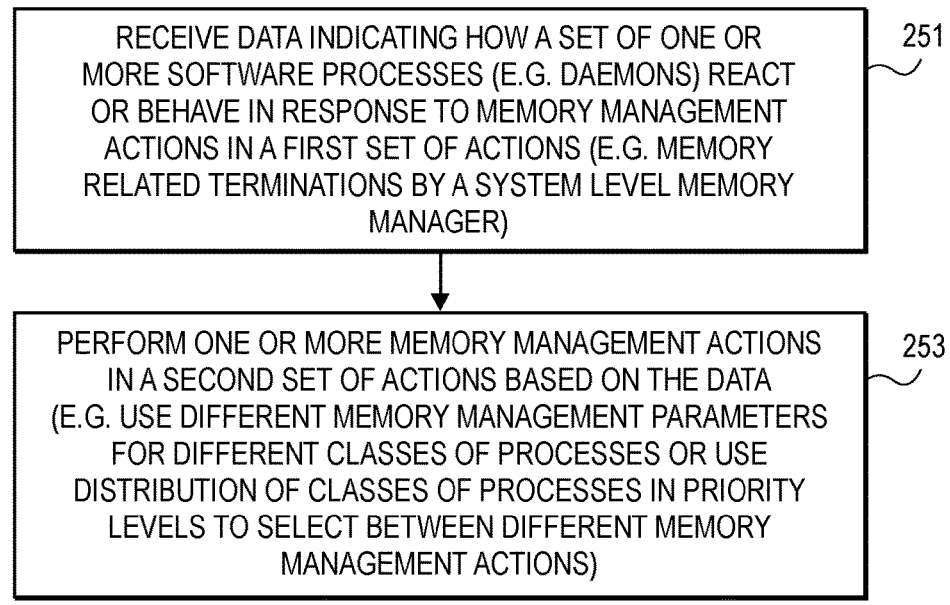
FIG. 3 is a flowchart which illustrates a method according to one embodiment described herein.

The embodiments described herein show how a system can learn how software processes react or behave in response to memory management actions and use that learned behavior to modify future memory management actions to improve the system's ability to maintain a sufficient and persistent amount of free memory which is available for use by the applications and daemons that have been launched or could be launched on the system. FIG. 3 shows an example of a method according to one embodiment in which the learned behavior can be used for future memory management actions. In operation 251, data is received which indicates how a set of one or more software processes, such as daemons or applications or both, react or behave in response to memory management actions in a first set of actions. These memory management actions in the first set of memory management actions can, for example, be memory related terminations by a system level memory manager, such as the memory manager 109. Examples of what this data can be and how it can be used are provided below. The data can be received by a memory manager (such as memory manager 109) through interprocess communications or other forms of communications between various software components, such as the launch process 105 which can in one embodiment communicate with the kernel 107 which includes the memory manager 109. The data received in operation 251 can be used to classify the software processes within at least two different classes which can be used in future memory management actions. After the data is received in operation 251, it can be used in operation 253 to perform one or more memory management actions in a second set of actions that follows (in time) the first set of actions. These memory management actions in the second set of actions can be based upon the data which was received in operation 251. For example, the memory management actions performed in operation 253 can use different memory management parameters (such as different delay times) for different classes of processes. As another example, the memory management actions in operation 253 can use a distribution of classes of processes in the priority levels, such as the priority levels 203 shown in FIG. 2, to select between different memory management actions (such as different modes of memory recovery).

Figure 4A:
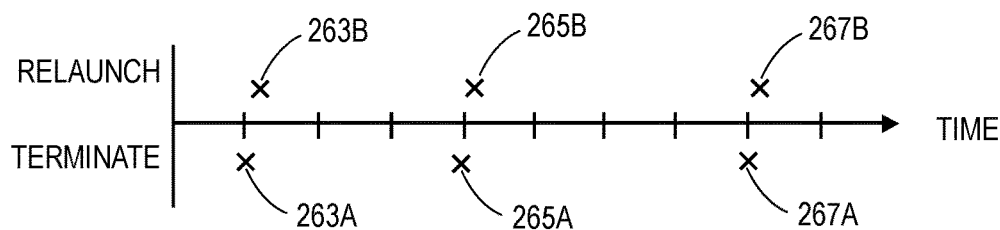
FIG. 4A shows an example of the collection of timestamp data for events related to memory management actions, such as process terminations.
Figure 4B:
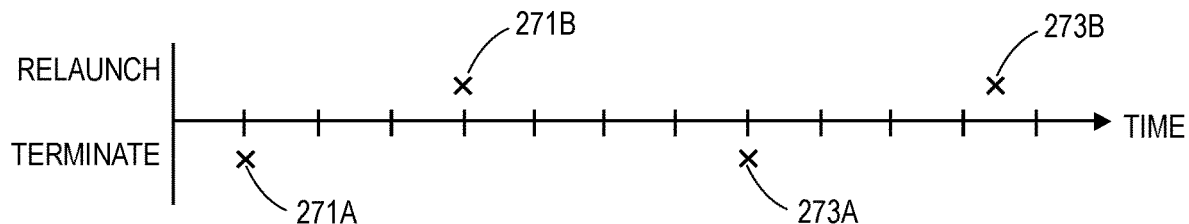
FIG. 4B also shows another example of the collection of timestamp data for events related to memory management actions, such as process terminations.

FIGS. 4A and 4B show two examples of how the data in operation 251 can be collected to learn the behavior of the software processes. FIG. 4A shows a sequence of consecutive events over time for a software process such as a daemon software process, and FIG. 4B shows another sequence of consecutive events over time for a software process such as another daemon software process. The consecutive events which are captured with timestamps in one embodiment include a memory related termination of a process which is followed by a relaunch of the process. In the example shown in FIG. 4A, the process is quickly relaunched after a memory related termination. In particular, termination 263A is quickly followed by a relaunch 263B. Similarly, the memory related termination 265A is quickly followed by a relaunch 265B. Also, the memory related termination 267A is quickly followed by a relaunch 267B of the software process. The data (such as timestamps) shown in FIG. 4A can be collected by a launch process (such as launch process 105) or some other software process and can then be communicated to a memory manager, such as the memory manager 109. The data shown in FIG. 4A and also in FIG. 4B can be timestamp data which indicates consecutive events in time between a memory related termination and a subsequent relaunch following the last memory related termination. The example of the data shown in FIG. 4A can produce the samples shown in FIG. 5A. The data shown in FIG. 4B shows a different type of process which does not quickly relaunch after a memory related termination. This can be seen in FIG. 4B; for example, the memory related termination 271A is not immediately followed by a relaunch; rather the relaunch 271B occurs sometime after the memory related termination 271A. Similarly, the relaunch 273B occurs sometime after the prior memory related termination 273A. The data shown in FIG. 4B can produce the samples shown in FIG. 5C which will now be described further below.

Figure 5A:
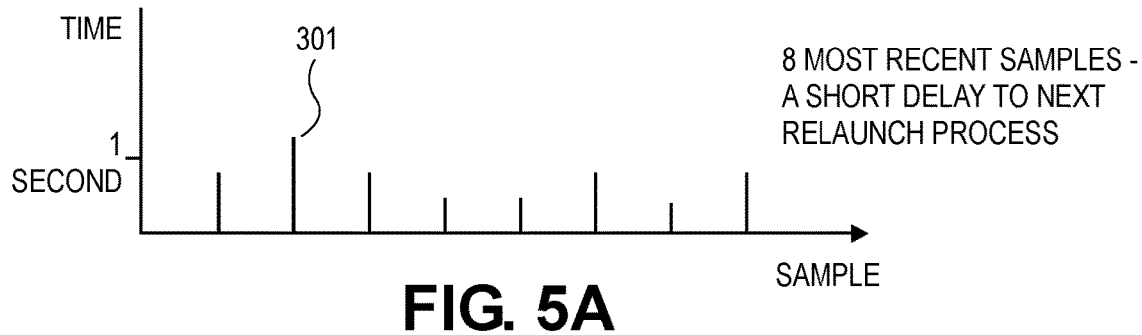
FIGS. 5A, 5B, and 5C show three examples of samples collected from 3 different classes of processes (short, medium, and long) according to one embodiment.
Figure 5B:
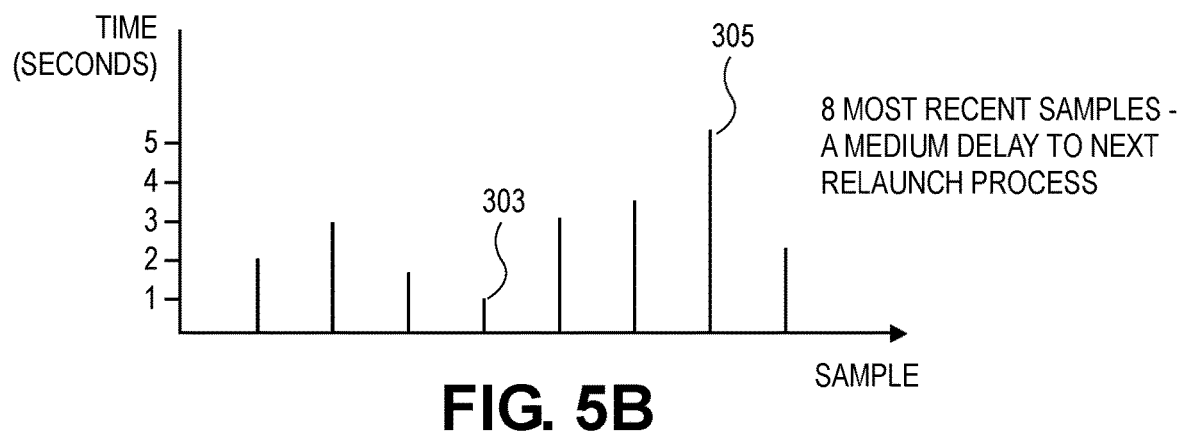
Figure 5C:
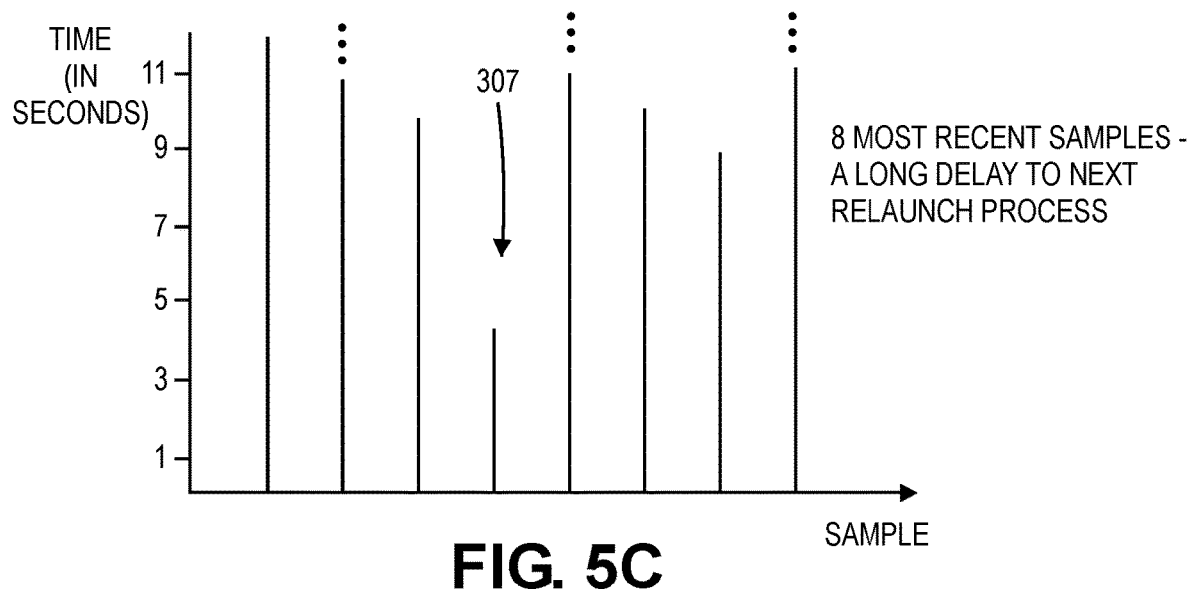

Referring now to FIGS. 5A, 5B, and 5C, three different classes of processes are shown in these three figures. In particular, FIG. 5A shows a process which is classified as a short delay to next relaunch process. FIG. 5B shows a process which is classified as a medium delay to next relaunch process. FIG. 5C shows a process which is classified as a long delay to next relaunch process. The classifications are based upon the time periods between consecutive events for a process which include a memory related termination followed by the next relaunch of the process that was terminated by the memory related termination. In one embodiment, if most of the samples for process are less than one second then the process can be classified as a short delay to next relaunch process, and if most of the samples for a process are between one second and five seconds then the process can be classified as a medium delay to next relaunch processed, and if most of the samples for a process are longer than five seconds then the process can be classified as a long delay to the next relaunch process. In the example shown in FIG. 5A, all but one of the samples is less than one second, which means that a memory related termination was followed in less than one second by a relaunch of the process which was terminated by the memory related termination. In other words, all samples for the process shown in FIG. 5 a except for sample 301 are less than one second, and the memory manager can classify this process as a short delay to next relaunch process. The classification can be based upon either a count within each class or an average value or a median value or other methods to classify the samples. In one embodiment, each of the samples is a rolling sample taken over time where the most recent number of samples is used such as the most recent N samples. In one embodiment, N can be 8 samples or 16 samples, and all prior samples are ignored. In the example shown in FIG. 5B, all but two samples are within the time period range of between one second and five seconds; in particular, except for samples 303 and 305, all of time samples shown in FIG. 5B are within the time frame of one second to five seconds, which means that this process can be classified as a medium delay to next relaunch process. In the example shown in FIG. 5C, all samples except for sample 307 are longer than five seconds, which means that this process can be classified as a long delay to next relaunch process. It will be appreciated that other time values (instead of less than 1 second, between 1 and 5 seconds, and more than 5 seconds) can be used in other embodiments and other methods for classification can be used such as median values, average values, and other statistical values which can be used to derive a classification for the process based upon a distribution of time periods of the samples for the process over a rolling sample over time.

Figure 6A:
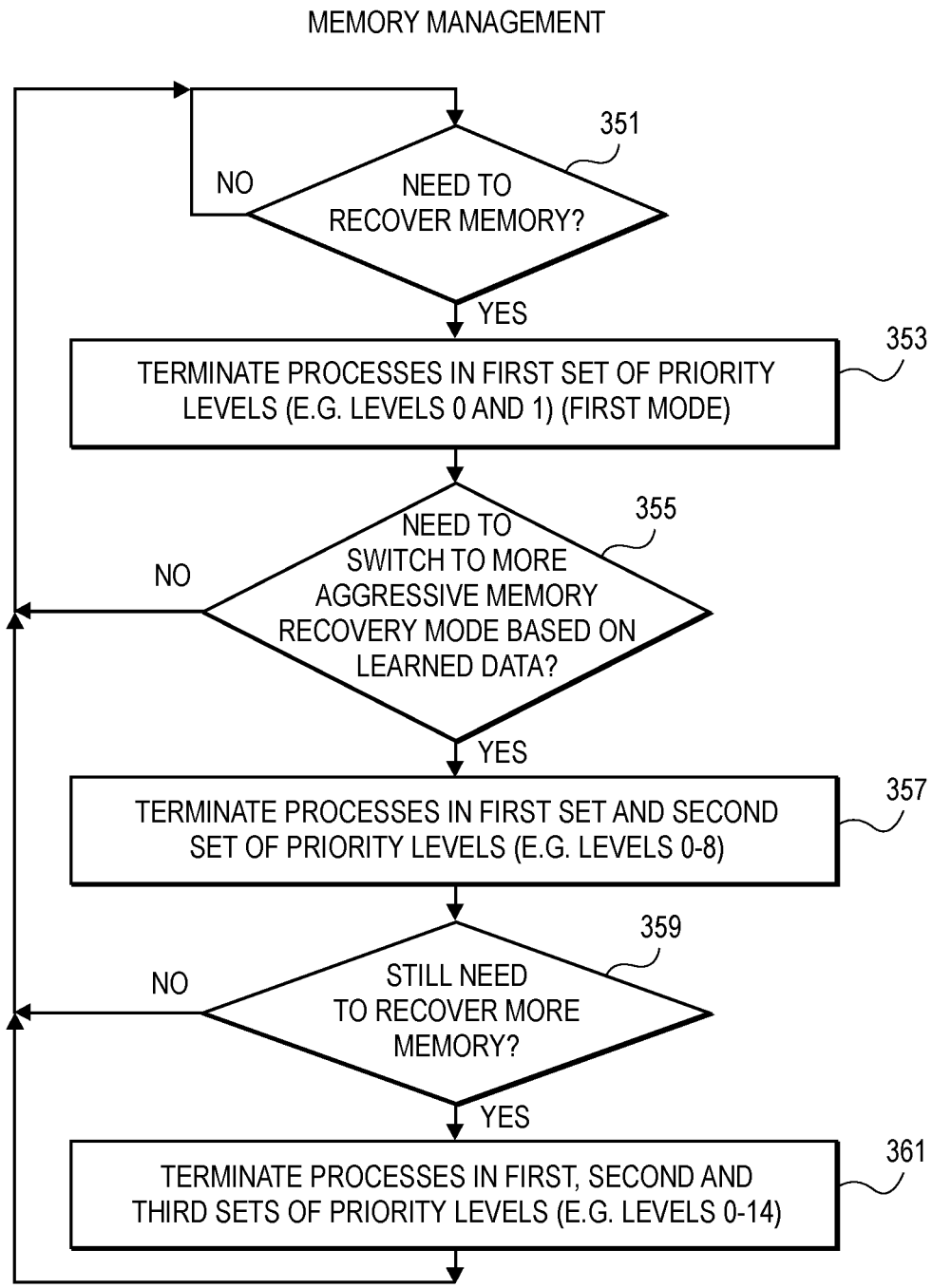
FIG. 6A is a flowchart which illustrates memory management actions according to one embodiment.

These classifications can be used to determine how future memory management actions are performed. FIG. 6A shows an example of a memory management method which is used to recover memory and which can use the data that has been learned about how processes react to memory management actions. The memory management method shown in FIG. 6A can be used to recover memory by terminating processes that have the lowest priority levels. The method shown in FIG. 6A can include a decision which is made at some point about whether to switch from a default mode for memory recovery through process terminations to a more aggressive memory recovery mode. This switch in one embodiment can be based upon the learned data about the processes. In operation 351 the memory manager can repeatedly determine whether or not memory needs to be recovered. This can be based upon techniques which are known in the art which can measure the amount of free memory and determine the so-called "memory pressure" in the system. As free memory is depleted and becomes smaller and smaller, the memory pressure grows which causes the memory manager to begin to terminate processes that have low priorities. This is shown in operation 353 in which the memory manager can terminate processes in a first set of priority levels, such as priority levels zero and one shown in FIG. 2. This can be considered a first mode of memory recovery in which the memory manager uses just the first mode as a default mode for memory recovery. If this does not produce sufficient amount of free memory for a persistent period of time, the system may need to decide whether or not to switch to a more aggressive memory recovery mode which is shown in operation 355. In operation 355, the memory manager can make this decision based upon the learned data. For example, the memory manager can determine that insufficient memory will be recovered if the memory manager continues to use only the first mode for memory recovery based upon the learned data. Operation 355 can include a plurality of parameters that are used in making this decision including, for example, the current free memory level in the system as well as the learned classes of processes in one or more priority levels. If operation 355 determines that the system needs to switch to a more aggressive memory recovery mode, then operation 357 follows in which the memory manager terminates processes in the first set of priority levels and also terminates processes in a second set of priority levels which may be levels zero through eight as shown in FIG. 6A. Then in operation 359 the memory manager can determine whether or not there is still a need to recover more free memory. If the need no longer exists processing can revert back to operation 351 as shown in FIG. 6A. On the other hand, if there is still a need to recover more memory as determined in operation 359, then the memory manager can terminate processes (in operation 361) in the first and the second and third sets of priority levels which in one embodiment can be priority levels zero through 14. After operation 361 the processing by the memory manager can revert back to operation 351 to repeat the method as shown in FIG. 6A.

While FIG. 6A shows a generalized example of how learned data can be used to decide when to switch between modes of memory recovery, FIG. 6B shows a more specific example of how a memory manager can switch between modes of memory recovery. Referring to FIG. 6B, in operation 371, the memory manager can determine whether or not there is a need to recover more memory (e.g., when free memory becomes too low; see for example published U.S. patent application number US 2015/0347181 and U.S. Pat. No. 7,827,358). The memory manager performs operation 371 repeatedly over time as shown in FIG. 6B. When the memory manager determines that there is a need to recover more memory, operation 373 follows operation 371. In operation 373, the memory manager in one embodiment counts the number of processes classified as a short delay to next relaunch in the first set of priority levels and determines whether the count exceeds a threshold value. Short delay to next relaunch processes are processes that tend to relaunch quickly after a memory related termination, and thus terminating those processes may not be able to produce sufficient amounts of free memory for a persistent period of time. Thus, if the number of processes which are classified as short delay does not exceed a threshold value, the system can proceed to operation 375 in which the memory manager terminates processes in only the first set of priority levels, such as priority levels zero and one in one embodiment and then returns to operation 371. On the other hand, if the number of such processes having a short delay does exceed a threshold value, then the system can switch in operation 377 to an aggressive memory recovery mode and terminate processes in more than one set of priority levels, such as priority levels zero through eight or priority levels zero through 14 in one embodiment. Following operation 377, the system can revert back to operation 371. Operation 373 in FIG. 6B shows one example of processing logic that can be used for the decision to switch between modes of memory recovery; other examples may use other approaches such as counting long delay processes or otherwise processing the distribution of the classes of the processes in the lowest priority levels (e.g., two lowest levels) to determine if insufficient free memory would be persistently recovered if the default mode or least aggressive mode of memory recovery is used. For example, if the number of "long delay" processes in these lowest priority levels is greater than a threshold value, then the processing logic can decide not to switch to an aggressive mode of memory recovery. FIGS. 6C and 6D show two examples of the distribution of process priority levels in a system which reflect how the method of FIG. 6B can be performed. In the case of FIG. 6D, the two lowest priority levels are full of only long delay to next relaunch processes (processes 398A through 398N in priority level 398 and processes 399A through 399N in priority level 399). This means that the memory manager can determine from the number of processes in those two lowest levels (398 and 399) that sufficient memory may be reclaimed in a persistent manner by terminating all of the long delay processes in the priority levels 398 and 399 which are the two lowest priority levels shown in the priority level data structure 396, in which the highest priority is level 397. Priority level data structure 391 shown in FIG. 6C shows a different situation in which the two lowest priority levels (394 and 395) are full of only short delay to next relaunch processes (processes 394A through 394N in priority level 394 and processes 395A through 395N in priority level 395), which means that terminating these processes using the default mode in which only the two lowest priority levels are used for process terminations, would not likely produce sufficient memory for a persistent period of time because the short delay to next relaunch processes will tend to relaunch their processes almost immediately after memory related process terminations. In the priority level data structure 391, level 392 is the highest level and there are intermediate levels 393 between level 392 and the two lowest priority levels 394 and 395. In one embodiment, a priority level data structure, such as priority level data structures 391 and 396, can at each level therein point to or be associated with a list of processes that have been assigned to the level in the priority level data structure. For example, short delay to next relaunch processes 394A through 394N are assigned to level 394 in priority level data structure 391, and short delay to next relaunch processes 395A through 395N are assigned to level 395 in priority level data structure 391. In the priority level data structure 396, long delay to next relaunch processes 398A through 398N are assigned to level 398 and long delay to next relaunch processes 399A through 399N are assigned to level 399. It will be appreciated that FIGS. 6C and 6D can show in one embodiment two different snapshots in time of the same priority level data structure on the same data processing system as a result of different processes running at different times on the data processing system.

Figure 7:
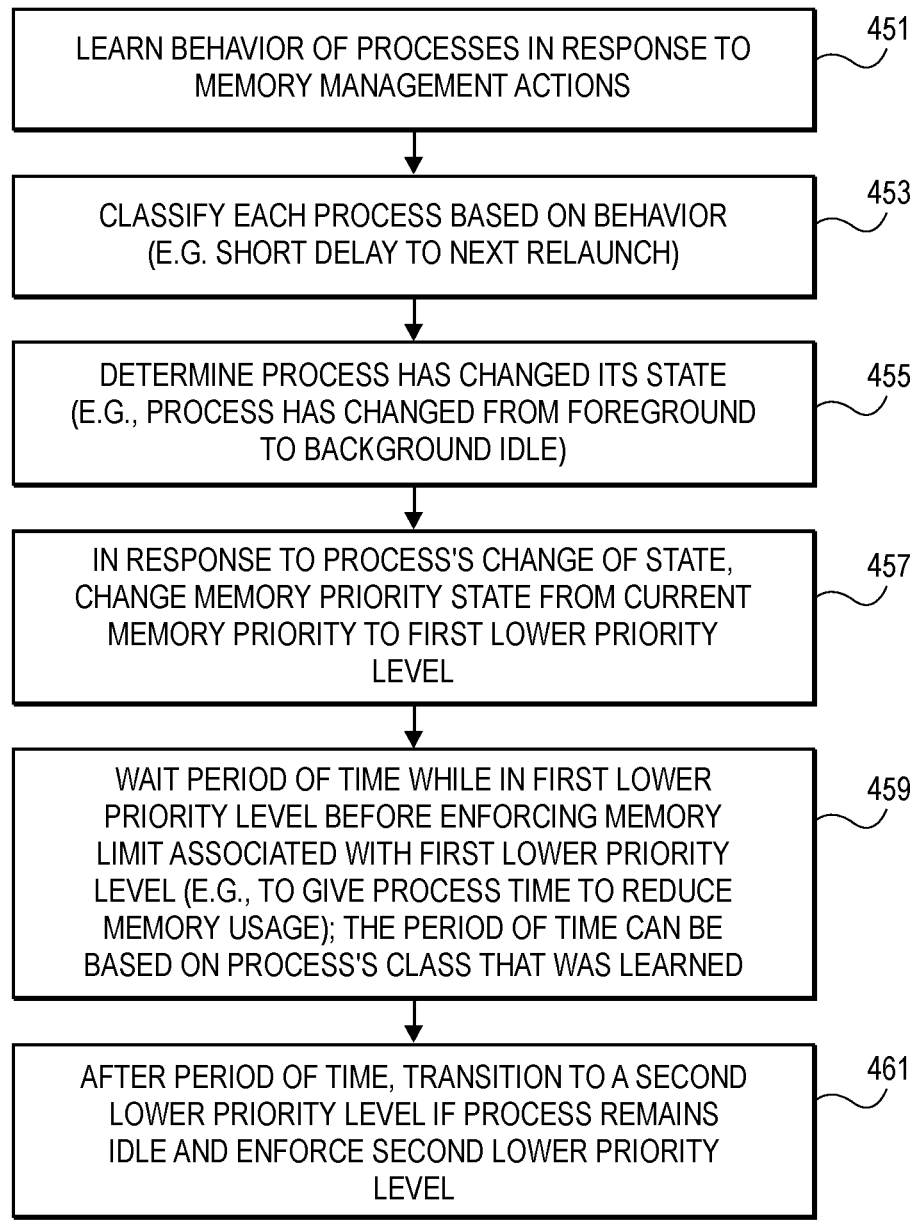
FIG. 7 is a flowchart which illustrates a method of performing memory management actions based upon learned behavior of processes that react to memory management actions.

FIG. 7 shows an example of another method according to an embodiment. In operation 451, the system learns the behavior of processes in response to memory management actions. For example, the system can learn the data shown in FIGS. 4A and 4B to derive the samples shown in FIGS. 5A, 5B, and 5C. Then the system can classify in operation 453 each process based upon the learned behavior. As a process is used on the device, the memory manager in operation 455 can determine that the process has changed its state. For example, the process has changed from a foreground application or foreground daemon process to a background idle process. In response to this change, in operation 457, the memory manager can change the memory priority state of the current memory priority to a lower priority level such as a first lower priority level. However, even though the priority level was changed, meaning that the process is no longer entitled to a larger amount of memory and will be required to operate with a smaller amount of memory, the system gives the process time before enforcing the lower memory limit, and this is shown in operation 459. The amount of time which is given before enforcing the new lower memory limit in one embodiment depends upon the class of the process that was learned in response to prior memory management actions. For example, if the process is a short delay to next relaunch process, then the process may be given more time to attempt to reduce its memory usage before the new memory limit is enforced, where the enforcement may be a process termination as described herein. On the other hand, if the process is a long delay to next relaunch process then the process may be given less time (than a short delay to next relaunch process) to attempt to reduce its memory usage before the new memory limit is enforced. After the period of time expires, in operation 461 the memory manager can then enforce the new memory limit and can also optionally transition the process to a second lower priority level if the process remains idle and can enforce the second lower priority level in one embodiment. In an alternative embodiment, operation 461 may be optional. In one embodiment, a data processing system can use an implementation of the method shown in FIG. 7 without using the memory recovery methods shown in either of FIGS. 6A and 6B; in another embodiment, a data processing system can use an implementation of one of the methods shown in either of FIGS. 6A and 6B without using an implementation of the method shown in FIG. 7. In yet another embodiment, a data processing system can independently use an implementation of the method shown in FIG. 7 and an implementation of one of the methods shown in either of FIG. 6A or 6B, and in this example, these methods can operate independently of each other.

Figure 8:
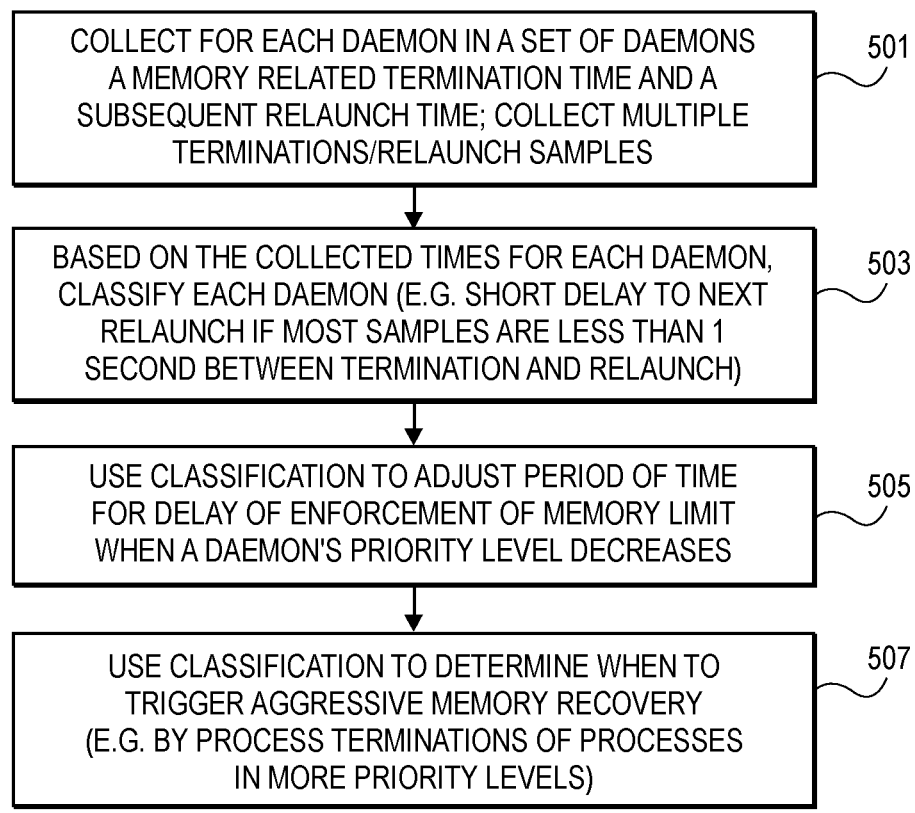
FIG. 8 is a flowchart which illustrates another method of performing memory management actions based upon learned behavior of processes that react to memory management actions.

FIG. 8 shows an example of a method which combines several of the aspects or embodiments described herein. In particular, the method shown in FIG. 8 combines the use of the classification to adjust the period of time for delay of enforcement of a new memory limit with an embodiment in which the classification is also used to determine when to trigger an aggressive memory recovery mode. In operation 501, a memory manager collects for each daemon in a set of daemons a memory related termination time and a subsequent next relaunch time. This collection of the multiple terminations and relaunches occurs repeatedly in one embodiment over time, and the samples are rolling samples over time storing only the most recent N samples. Then in operation 503, the memory manager can classify each daemon based upon the collected samples. In one embodiment, the collected times can be timestamps provided by another system component, such as a launch process. The classifications can be based upon these time periods, and there can be at least two classes and in one embodiment there can be three classes of processes based upon these time periods. Then in operation 505, the system can use the classification to adjust the period of time for delay of enforcement of a new memory limit when the daemon's priority level decreases. For example, if the daemon is caused to be launched by an application and the application has been terminated by the user, the daemon may switch to a background idle state which can cause its priority level status to drop to a low level, such as level 1 or level 0 shown in FIG. 2. Before the system enforces the new (reduced) memory limit based upon a priority level of one or zero, the system can give the daemon process time to adjust its memory before enforcing the new memory limit. Operation 507 can also be performed as part of the method shown in FIG. 8 and can precede operation 505 or follow operation 505. In operation 507, the system can use the classification to determine when to switch to an aggressive memory recovery mode which can be performed through process terminations of processes in more priority levels as described herein.

The memory manager 109 was described above for one embodiment of the disclosure. One of ordinary skill in the art will realize that in other embodiments, this component can be implemented differently. For instance, in one embodiment described above, certain components can be implemented as software that executes in one or more processors. However, in another embodiment, some or all of the components may be implemented by hardware, which can be dedicated application specific hardware (e.g., an ASIC chip or component) or a general purpose chip (e.g., a microprocessor or FPGA).

Figure 9:
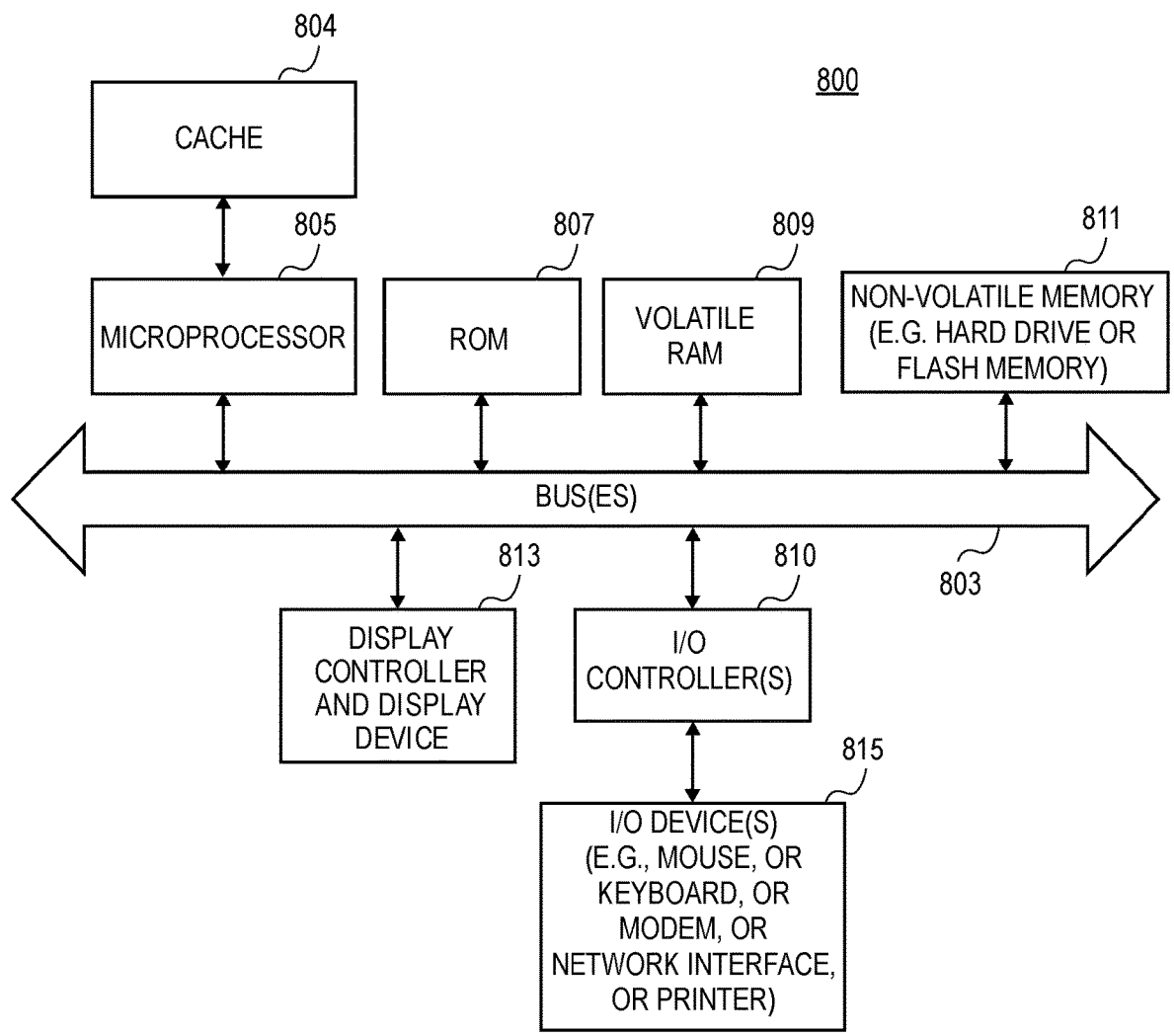
FIG. 9 shows one example of a data processing system which may be used to perform the one or more methods described herein.

FIG. 9 shows one example of a data processing system 800, which may be used with one embodiment. For example, the system 800 may be implemented to include a device 100 as shown in FIG. 1. Note that while FIG. 9 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 9, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 9 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

The foregoing discussion merely describes some exemplary embodiments of the disclosure. One skilled in the art will readily recognize from such discussion, the accompanying drawings and the claims that various modifications can be made without departing from the spirit and scope of the disclosure.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing executable program instructions which when executed by a data processing system cause the data processing system to perform a method, the method comprising:
   receiving a set of data for a software process, the set of data indicating a set of one or more time periods between a memory-related termination of the software process and a subsequent relaunch of the software process;
   classifying the software process to provide a classification for use in one or more memory management actions, the classification based on the set of one or more time periods, wherein the one or more memory management actions are based on the classification.

2. The medium as in claim 1 wherein each time period in the set of one or more time periods indicates a time between consecutive events for the software process of (1) the memory-related termination and (2) the subsequent relaunch such that each time period starts with a memory-related termination and ends with a next relaunch that follows the immediate prior memory-related termination.

3. The medium as in claim 2 wherein the software process is a daemon that provides services for one or more applications and the memory-related termination is a memory management action performed by a management system that monitors free memory and uses memory management actions to ensure the data processing system has a sufficient amount of free memory available for use by applications and daemons executing on the data processing system.

4. The medium as in claim 2 wherein the classifying is repeated over time as samples of the time periods are collected and the samples are rolling samples over time such that the last N time periods are used to classify the software process and time periods before the last N time periods are ignored.

5. The medium as in claim 2 wherein each time period in the set of one or more time periods is based on timestamps for the consecutive events.

6. The medium as in claim 2 wherein the classification includes at least two classes (1) a first class for a short delay to next relaunch and (2) a second class for a long delay to next relaunch.

7. The medium as in claim 6 wherein the classification is based on a most common class for delay to next relaunch over a set of sampled time periods such that a daemon that has, over the set of sampled time periods, more short delay to next relaunch than any other class will be classified as in the first class.

8. The medium as in claim 7 wherein the software process is a daemon and wherein the method is performed separately for each daemon in a set of daemons that include the daemon.

9. The medium as in claim 1 wherein a first memory management action of the one or more memory management actions comprises delaying enforcement of a memory limit reduction for the software process in response to a priority transition of the software process.

10. The medium as in claim 9 wherein enforcement of a memory limit reduction for a first class of processes is delayed for a first time period and enforcement of a memory limit reduction for a second class of processes is delayed for a second time period which is different than the first time period, and wherein the first class is for processes classified as having a short delay to next relaunch and the first time period is longer than the second time period.

11. The medium as in claim 10 wherein enforcement of memory limit reduction comprises changing a priority of the software process when classified in the first class from a first level to a second level and waiting for the first time period while in the second level and then changing the priority, after the first time period, to a third level and wherein the third level has a lower priority than the second and first levels, and wherein the first level is used when the software process is active and not idle.

12. The medium as in claim 1 wherein a first memory management action of the one or more memory management actions comprises determining when to switch from a first mode of memory recovery to a second mode of memory recovery, and wherein the second mode terminates daemon software processes in more priority levels than the first mode.

13. The medium as in claim 12 wherein the first mode terminates one or more daemon software processes in a first set of one or more priority levels and the second mode terminates daemon software processes in the first set of one or more priority levels and also in a second set of one or more priority levels.

14. The medium as in claim 13 wherein memory recovery is switched to the second mode based on (1) a current free memory level and (2) how many of the daemon software processes in the first set of one or more priority levels are in a first class defined by a short delay to next relaunch or how many of the daemon software processes in the first set of one or more priority levels are in a second class defined by a long delay to next relaunch.

15. The medium as in claim 14 wherein the first mode is a default mode for memory recovery by process terminations and wherein when a majority of the daemon software processes in the first set of one or priority levels are in the second class and can, if terminated, produce a sufficient increase in free memory then there is no switch from the first mode to the second mode.

* * * * *